Nov. 1, 1949  W. L. JOHNSON  2,486,747
WINDROWER

Filed April 9, 1948   4 Sheets-Sheet 1

INVENTOR.
WALDEMAR L. JOHNSON,
BY
McMorrow, Berman & Davidson
ATTORNEYS.

Nov. 1, 1949     W. L. JOHNSON     2,486,747
WINDROWER

Filed April 9, 1948     4 Sheets-Sheet 3

INVENTOR.
WALDEMAR L. JOHNSON,
BY
McMorrow, Berman & Davidson
ATTORNEYS.

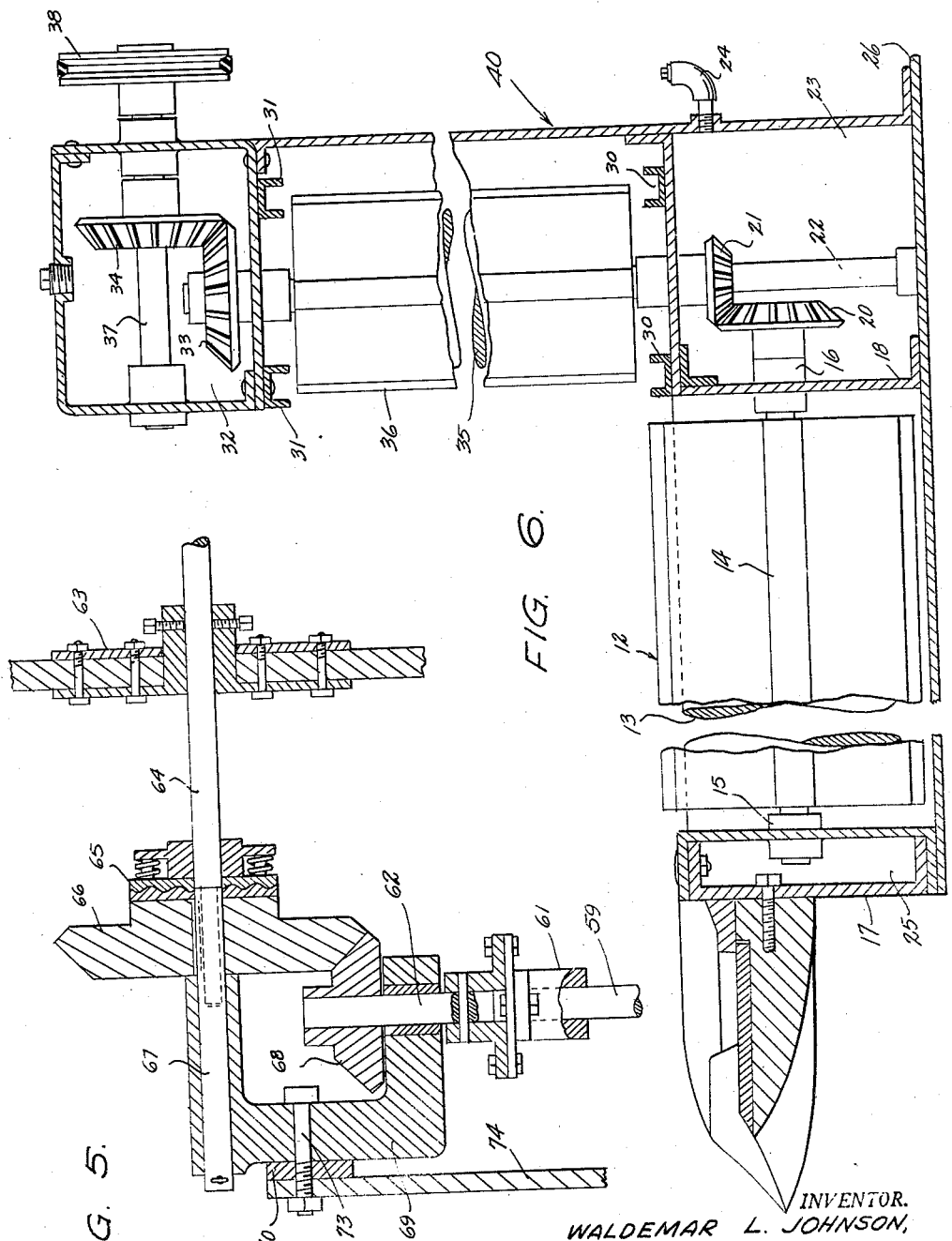

Patented Nov. 1, 1949

2,486,747

UNITED STATES PATENT OFFICE 2,486,747

WINDROWER

Waldemar L. Johnson, Nome, N. Dak.

Application April 9, 1948, Serial No. 19,992

5 Claims. (Cl. 56—192)

This invention relates to improvements in windrowers.

An object of the invention is the provision of windrower in which a novel and practical means is employed for urging and guiding the heads of cut crop into a uniform position on the usual conveyor which carries the crop to a discharge opening so that all of the heads will be directed into the opening and the grain stalks will be placed in a uniform manner in windrows to be picked by a combine even under adverse weather conditions.

A further object of the invention is the provision of a windrower in which a novel and practical means is employed for maintaining uniform positions of the crop that has been cut with the straws or stalks having the heads thereof disposed in one direction after they have been discharged through the usual opening in the windrower and deposited in windrows for pick-up by a combine, said means including a guiding conveyor located in a vertical plane and running in the same direction as the main conveyor which carries the crop to the discharge opening in the windrower but at a faster speed so that when the crop is reeled onto the main conveyor the head of the crop will be engaged by the faster moving guiding conveyor and prevent the heads from being turned backwardly by the usual windshield, the guiding conveyor operating in front of the windshield, the usual reel being adjustable vertically and horizontally relative to both conveyors.

The invention is best understood from a consideration of the detailed description in connection with the accompanying drawings, nevertheless, it is to be understood that the invention is not confined to the disclosure but is susceptible of such changes and modifications as shall define no material departure from the salient features of the invention as expressed in the appended claims.

In the drawings:

Figure 5 is an enlarged fragmentary vertical section taken along the line 5—5 of Figure 1, and Figure 6 is an enlarged vertical section taken along the line 6—6 of Figure 2.

Figure 1:
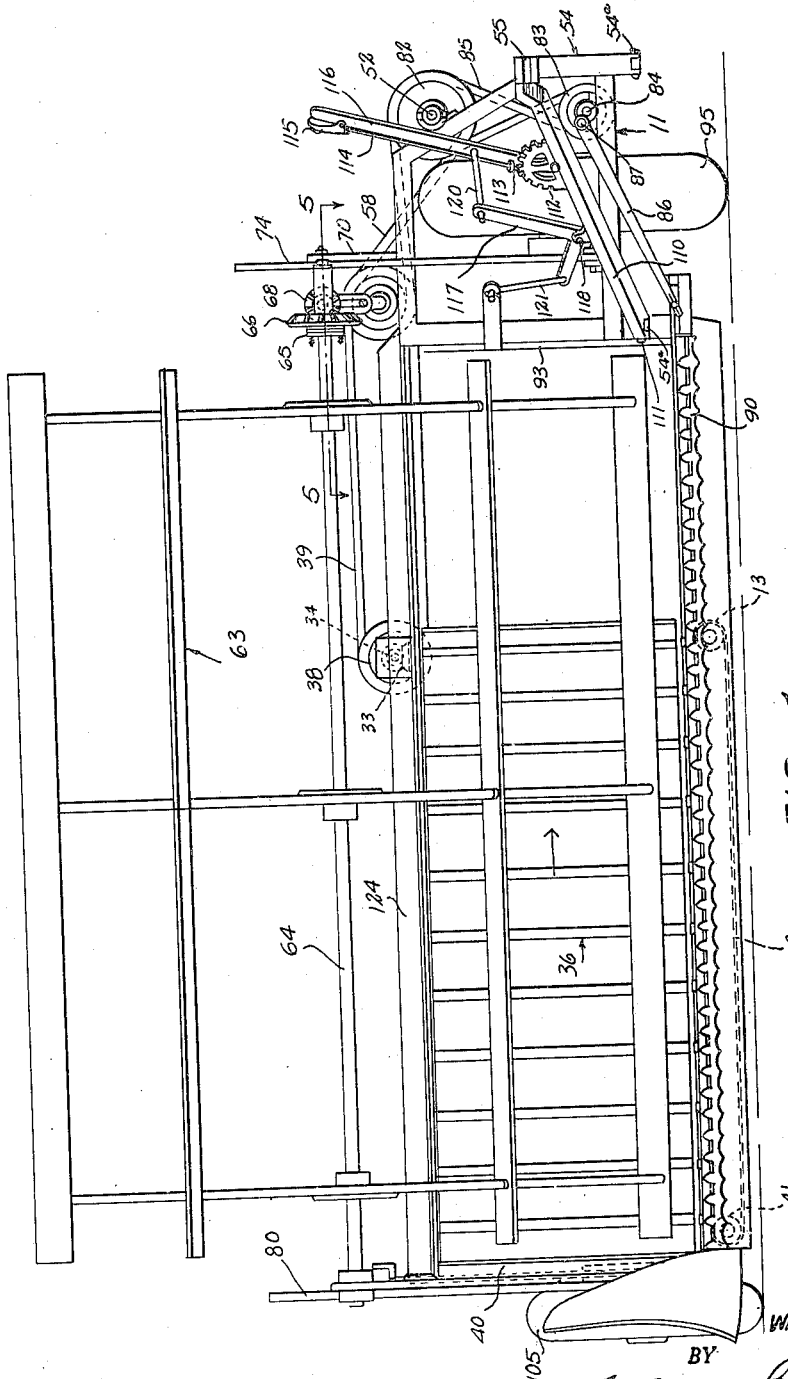
Figure 1 is a front view in elevation of my improved windrower.

Referring more particularly to the drawings 10 designates a main supporting frame to which is connected an auxiliary side frame 11. The frames are made of angle irons and channel beams.

A horizontal conveyor 12 is mounted on the main frame and is operated by a drum 13 (Figures 2 and 6) which is secured to a shaft 14 mounted in bearings 15 and 16 carried by channel beams 17 and 18 respectively of the main frame. Shaft 14 is driven by intermeshing gears 20 and 21 with gear 21 secured to a vertical shaft 22. These gears are mounted in a casing 23 which is supplied with a lubricant through a nipple 24. The bearing 16 is located in the casing 23 while the bearing 15 is supplied with a lubricant packed in a casing 25 enclosing a portion of the bearing 15. The casings are mounted on a platform 26 of the main frame. The platform is provided with the usual opening at the inner end of the conveyor 12 for the discharge of the cut stock.

Figure 2:
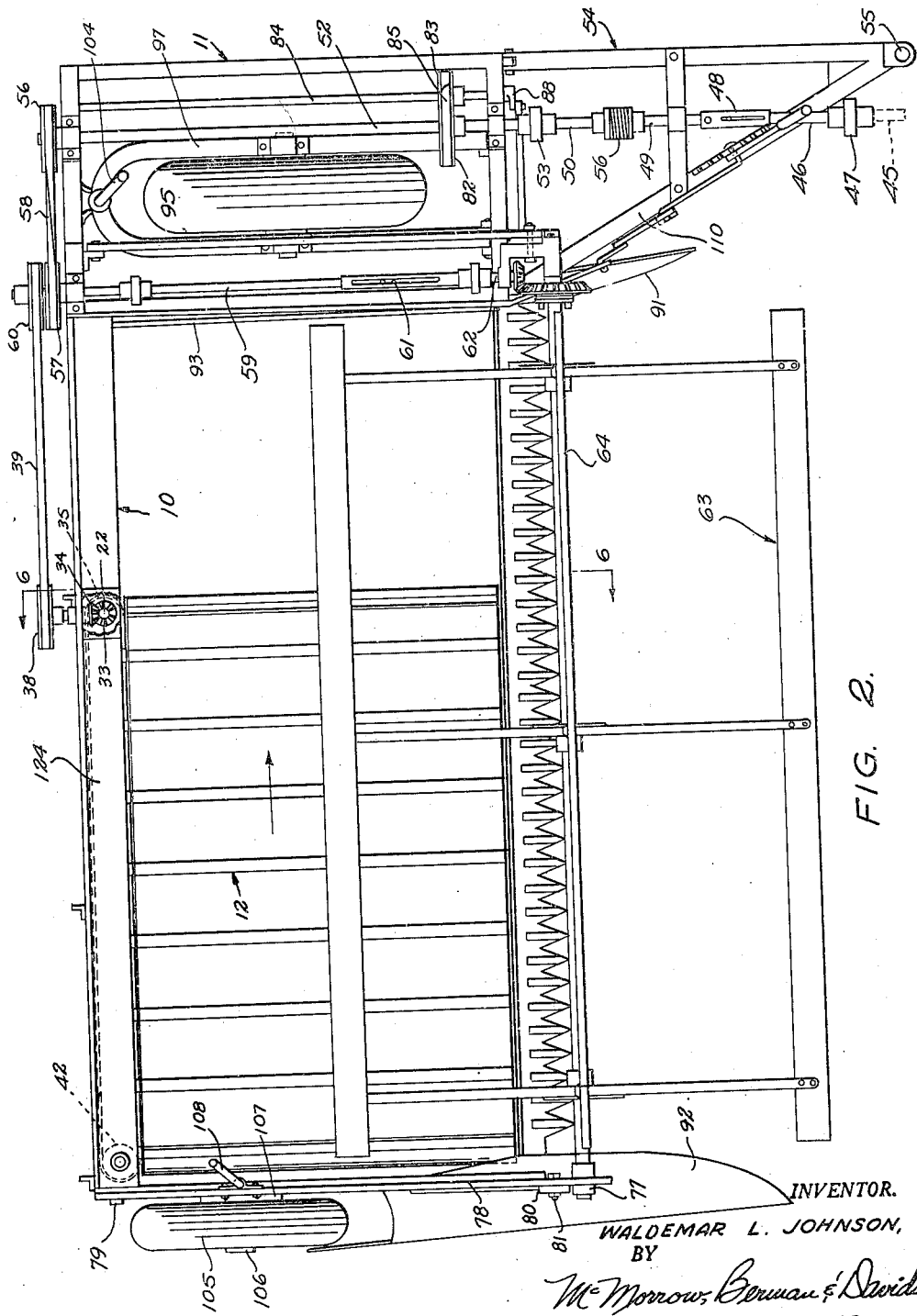
Figure 2 is a plan view of the windrower.

Channel bars 30 and 31 of the main frame are connected respectively with the top of the casing 23 and the bottom of a casing 32 which is supplied with a lubricant and which encloses intermeshing gears 33 and 34. Gear 33 is secured to the upper end of the vertical shaft 22 for driving a roller or drum 35 upon which is trained a guiding conveyor 36. Gear 34 is secured to a shaft 37 having bearings on the vertical walls of the casing 32. A pulley 38 is fixed to the outer projecting end of the shaft 34 and is driven by a belt 39 in a manner to be described presently. The rear walls of the casings 23 and 32 are included in a windshield 40 extending vertically across the main frame 10 (Figures 2 and 6).

Each of the conveyors 12 and 36 is in the form of a canvas belt provided with spaced transverse slats. The belt 12 is trained not only on the driving roller 13 but on an idling roller 41 (Figure 1). The belt 36 is trained on the driving roller 35 and an idler 42. The lower edge of the belt 36 travels close to the rear moving edge of the belt 12 but at a greater speed than the last-mentioned belt.

A power take-off 45 of a propelling tractor (not shown) is attached to a shaft 46 by a universal member 47. The shaft has a sliding connection 48 with a shaft 49 which drives a shaft 50 through a resilient means 51. A counter-shaft 52 forming the main driving element of the windrower is operated by the shaft 50 by means of a universal joint 53. The shaft 52 is carried by bearings on the frame 11 while the shafts 46 and 49 are mounted in bearings on a triangularly shaped frame or tongue 54 extending forwardly of and pivoted at 54a to the auxiliary frame 11. The free end of the frame 54 is provided with means 55 for attachment to the tractor.

The shaft 52 rotates a pulley 56 for driving a pulley 57 by a belt 58. The pulley 57 is fixed to a shaft 59 carried by bearings on the auxiliary frame 11. A second pulley 60 is fixed to the shaft 59 and drives the belt 39. The belt 58 is twisted to reverse the rotation of shaft 59 and likewise the shafts 14 and 22. A slip joint 61 connects a shaft 62 to the shaft 59 (Figures 2 and 5).

A reel 63 is revolved by a shaft 64. This shaft (Figures 1, 2 and 5) in turn is operated by a slip clutch 65, a gear 66 and a stub shaft 67 keyed to said gear. The gear 66 and a gear 68 meshing therewith are carried by a bracket 69 which is provided with bearings for the shafts 62 and 67. The gear 68 is fixed to the shaft 62. It is to be seen from Figure 5 that one of the clutch elements is secured to the shaft 67.

A bar 70 adjacent one end of the shaft 64 (Figures 3 and 5) is pivoted at 71 at the rear of the frame 11. The forward end of said bar has a plurality of perforations 72 to receive a bolt 73 attached to the bracket 69. A second bar 74 rising from a pivot 75 on the forward end of the frame 11 has a plurality of perforations 76, one of which being received by the bolt 73. A bearing 77 receives the other end of the shaft 64 and is supported by a bar 78 pivoted at 79 on the rear end of the main frame 10. The bar 78 corresponds in position and function with the bar 70 just described. A second bar 80 corresponding to the bar 74 is pivoted at its lower end on the forward end of the main frame and is provided with a plurality of perforations cooperating with perforations in the bar 78 to receive a bolt 81 for adjustably positioning the bearing 77. It will be seen from this construction that the shaft 64 and likewise the reel 63 may be elevated or lowered while at the same time moving said reel rearwardly or forwardly relative to the conveyors 12 and 36.

A pulley 82 (Figures 1 and 2) fixed to the shaft 52 drives a pulley 83 secured to a shaft 84 mounted in bearings on the auxiliary frame 11. A twisted belt 85 is trained on the pulleys. A pitman 86 has one end pivoted on an eccentric pin 87 of a crank 88 secured to the forward end of the shaft 84. The other end of said pitman is connected to a conventional form of sickle bar 90 operated in a plane above the conveyor 12.

Figure 3:
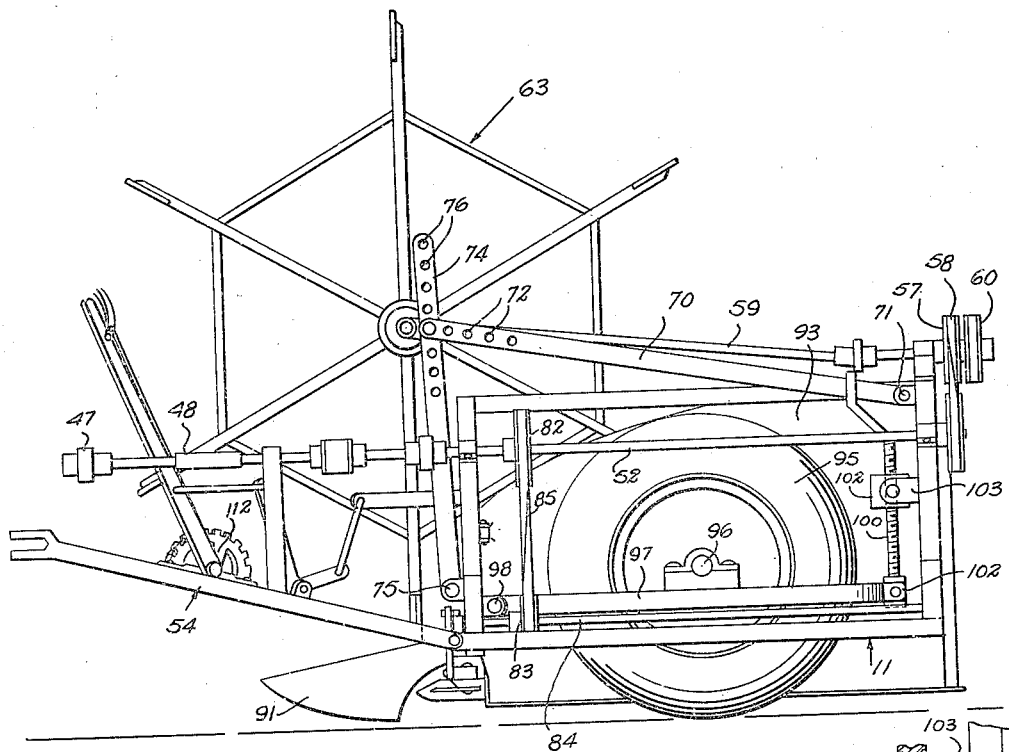
Figure 3 is a side view in elevation of the windrower.

An inner divider 91 projects forwardly from one end of the main frame 10 adjacent the auxiliary frame 10 and in front of the sickle bar (Figure 3). An outer divider 92 extends forwardly from the other end of the main frame. A metal plate 93 is attached to the auxiliary frame from the front end to the rear end thereof to prevent the stock from getting into the moving parts of said auxiliary frame.

Figure 4:
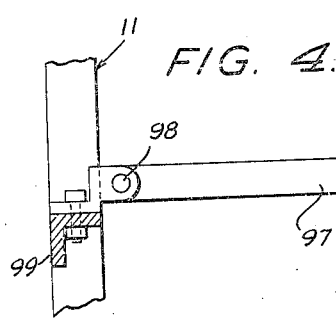
Figure 4 is an enlarged transverse vertical of the means for raising a supporting wheel of the windrower.

A main supporting wheel 95 is mounted on an axle 96 secured to a U-shaped lever 97 which has its legs pivoted at 98 on a bar 99 of the auxiliary frame (Figures 2, 3 and 4). A screw 100 has its lower end rotatably mounted in a bearing 101 at the bight portion of the lever 97. A nut 102 receives the screw and is pivoted on ears 103 extending from a rear bar of the auxiliary frame. A crank 104 formed integrally with the upper end of the screw is adapted to rotate the screw for raising or lowering the wheel 95 relative to the bottom of the windrower. The device just described adjusts the position of the sickle bar above the ground.

A grain wheel 105 is mounted on an axle 106 (Figure 2) and this axle is adjusted vertically. A block 107 carries the axle and a screw mounted on the adjacent end of the main frame causes the block and axle to be raised or lowered when a crank 108 revolves the screw. This construction is a simplified form of the adjustable mounting for the wheel 95 since the wheel 105 does not carry the load that is pressed upon the wheel 95.

The hinged frame or draw bar 54 (Figures 1, 2 and 3) includes a brace bar 110 which is hinged at 111 to the inner portion of the auxiliary frame. An arcuate rack 112 is secured to the top of the bar 110 and is engaged by a pawl 113 operated by a link 114 and a hand lever 115 pivoted on a main lever 116 which in turn is pivoted on a side of the rack 112 in a conventional manner. A bellcrank 117 pivoted at 118 on the bar 110 has one arm connected to the lever 116 by a rod 120 while the other arm is connected by a link 121 to a stationary bar 122 projecting from a vertical bar of the auxiliary frame. The lever 116 is employed for adjusting the height of the tongue or draw bar 54 and for maintaining such adjustment.

It will be noted from Figures 1 and 2 that an angle iron 124 is disposed at the rear end of the main frame and at the top of said frame. A portion of this angle iron forms two walls of the casing 32 (Figure 6).

In conventional windrowers, the conveyor 12 carries the stock to the usual discharge opening in the windrower. However, the windshield 40 will engage the heads of the stock so that the heads will tend to turn rearwardly and the stock will not be discharged in uniform windrows. The windshield is an important element of the windrower because it protects the cut stock on the conveyor from being piled up by the wind. Various means have been proposed for preventing the stock from being turned on the conveyor but so far none have given practical results.

With the back or auxiliary conveyor 36 running at a slightly faster speed than the conveyor 12 the heads are pulled forwardly and guided in a uniform manner through the discharge opening of the windrower. Thus the stock will be placed in windrows in a uniform direction for pick-up by the combine.

The adjustment of the reel 63 by the supporting elements relative to the main conveyor 12 causes the reel to be moved towards or away from the conveyor 36. Thus, the reel may be moved towards the conveyor 12 while being shifted towards the vertical guiding means 36. On the other hand, the reel may be raised above the conveyor 12 while maintaining its distance from the conveyor 36. The reel may be moved to other positions to obtain various combinations of adjustments relative to the conveyors. The reel is adjusted with respect to both conveyors to give the best results for applying the stock to the main conveyor so that the heads will be urged in the proper direction by the guiding means 36.

The sliding connections for the various shafts are provided for the adjustments of the reel and tongue 54. The various universal joints also provide ease in operation of the shafts when adjustments are made.

What I claim:

1. In a windrower including a horizontally-disposed frame having a cutting means disposed along one side thereof for cutting stalks, a platform disposed on said frame and carried by the latter, said platform being provided with an opening adjacent one end thereof for the discharge of cut stalks therethrough, a horizontally-disposed endless conveyor intermediate the opening and the other end of said platform arranged in spaced relation above said platform and mounted for rotation about horizontal axes, a vertically-disposed endless conveyor arranged adjacent the opposite side of said frame and mounted for rotation about vertical axes for guiding the cut stalks onto said first-named conveyor, a vertically-disposed windshield positioned to the rear of and spaced from said second-named conveyor and fixedly carried by said platform for retaining the cut stalks in engagement with the second-named conveyor, a reel positioned transversely of and spaced from said first and second-named conveyors and mounted for rotation about a horizontal axis for feeding the cut stalks onto said first-named conveyor, and means for rotating said conveyors and said reel.

2. In a windrower including a horizontally-disposed frame having a cutting means disposed along one side thereof for cutting stalks, a platform disposed on said frame and carried by the latter, said platform being provided with an opening adjacent one end thereof for the discharge of cut stalks therethrough, a horizontally-disposed endless conveyor intermediate the opening and the other end of said platform arranged in spaced relation above said platform and mounted for rotation about horizontal axes, a vertically-disposed endless conveyor arranged adjacent the opposite side of said frame and mounted for rotation about vertical axes for guiding the cut stalks onto said first-named conveyor, a vertically-disposed windshield positioned to the rear of and spaced from said second-named conveyor and fixedly carried by said platform for retaining the cut stalks in engagement with the second-named conveyor, a reel positioned transversely of and spaced from said first and second-named conveyor and mounted for rotation about a horizontal axis for feeding the cut stalks onto said first-named conveyor, means for raising and lowering the rotational axis of said reel with respect to said first-named conveyor, means for securing the rotational axis of said wheel in its adjusted position, and means for rotating said conveyors and said reel.

3. In a windrower including a horizontally-disposed frame having a cutting means disposed along one side thereof for cutting stalks, a platform disposed on said frame and carried by the latter, said platform being provided with an opening adjacent one end thereof for the discharge of cut stalks therethrough, a horizontally-disposed endless conveyor intermediate the opening and the other end of said platform arranged in spaced relation above said platform and mounted for rotation about horizontal axes, a vertically-disposed endless conveyor arranged adjacent the opposite side of said frame and mounted for rotation about vertical axes for guiding the cut stalks onto said first-named conveyor, a vertically-disposed windshield positioned to the rear and spaced from said second-named conveyor and fixedly carried by said platform for retaining the cut stalks in engagement with the second-named conveyor, a reel positioned transversely of and spaced from said first and second-named conveyors and mounted for rotation about a horizontal axis for feeding the cut stalks onto said first-named conveyor, means for raising and lowering the rotational axis of said reel with respect to said first-named conveyor, means for securing the rotational axis of said wheel in its adjusted position, means for shifting the rotational axis of said reel forwardly and backwardly with respect to said first and second-named conveyors, means for securing the rotational axis in its adjusted forwardly and backwardly position, and means for rotating said conveyors and said reel.

4. In a windrower including a horizontally-disposed frame having a cutting means disposed along one side thereof for cutting stalks, a platform disposed on said frame and carried by the latter, said platform being provided with an opening adjacent one end thereof for the discharge of cut stalks therethrough, a horizontally-disposed endless conveyor intermediate the opening and the other end of said platform arranged in spaced relation above said platform and mounted for rotation about horizontal axes, a vertically-disposed endless conveyor arranged adjacent the opposite side of said frame and mounted for rotation about vertical axes for guiding the cut stalks onto said first-named conveyor, a vertically-disposed windshield positioned to the rear of and spaced from said second-named conveyor and fixedly carried by said platform for retaining the cut stalks in engagement with the second-named conveyor, a reel positioned transversely of and spaced from said first and second-named conveyors and mounted for rotation about a horizontal axis for feeding the cut stalks onto said first-named conveyor, means for shifting the rotational axis of said reel forwardly and backwardly with respect to said first and second-named conveyors, means for securing the rotational axis in its adjusted position, and means for rotating said conveyors and said reel.

5. In a windrower including a horizontally-disposed frame having a cutting means disposed along one side thereof for cutting stalks, a platform disposed on said frame and carried by the latter, said platform being provided with an opening adjacent one end thereof for the discharge of cut stalks therethrough, a horizontally-disposed endless conveyor intermediate the opening and the other end of said platform arranged in spaced relation above said platform and mounted for rotation about horizontal axes, a vertically-disposed endless conveyor arranged adjacent the opposite side of said frame and mounted for rotation about vertical axes for guiding the cut stalks onto said first-named conveyor, a vertically-disposed windshield positioned to the rear of and spaced from said second-named conveyor and fixedly carried by said platform for retaining the cut stalks in engagement with the second-named conveyor, a reel positioned transversely of and spaced from said first and second-named conveyors and mounted for rotation about a horizontal axis for feeding the cut stalks onto said first-named conveyor, and means for rotating said conveyors at different speeds.

WALDEMAR L. JOHNSON.

REFERENCES CITED

The following references are of record in the file of this patent:

UNITED STATES PATENTS

| Number | Name | Date |
|---|---|---|
| 377,067 | Gemmill | Jan. 31, 1888 |
| 688,330 | Peek | Dec. 10, 1901 |